United States Patent [19]
Jörg

[11] Patent Number: 5,572,906
[45] Date of Patent: Nov. 12, 1996

[54] TRANSMISSION HOUSING

[76] Inventor: Helmut Jörg, Roffeelgasse 25, A-1200 Vienna, Austria

[21] Appl. No.: 335,831

[22] PCT Filed: May 3, 1993

[86] PCT No.: PCT/AT93/00076

§ 371 Date: Jan. 3, 1995

§ 102(e) Date: Jan. 3, 1995

[87] PCT Pub. No.: WO93/22584

PCT Pub. Date: Nov. 11, 1994

[30] Foreign Application Priority Data

May 4, 1992 [AT] Austria ........................................ 903/92

[51] Int. Cl.$^6$ ............................. F16H 57/02; F16H 1/14; F16H 1/16
[52] U.S. Cl. ............................ 74/425; 74/417; 74/606 R; 403/331; 403/381
[58] Field of Search ......................... 74/417, 425, 606 R; 248/223.41, 224.51, 224.61, 298.1; 403/331, 381

[56] References Cited

U.S. PATENT DOCUMENTS

| | | | |
|---|---|---|---|
| 3,420,117 | 1/1969 | Gossett | 74/417 |
| 3,521,504 | 7/1970 | Jorg | 74/606 R |
| 3,992,956 | 11/1976 | Fischer | 74/606 R X |
| 4,020,715 | 5/1977 | Sollars | 74/606 R |
| 4,580,329 | 4/1986 | Bihler et al. | 74/425 X |
| 4,641,805 | 2/1987 | Martensson IV | 248/223.41 X |

FOREIGN PATENT DOCUMENTS

| | | |
|---|---|---|
| 0352416 | 1/1990 | European Pat. Off. . |
| 3821632 | 2/1989 | Germany . |
| 2034612 | 6/1980 | United Kingdom . |

Primary Examiner—Allan D. Herrmann
Attorney, Agent, or Firm—Herbert Dubno; Andrew Wilford

[57] ABSTRACT

A drive unit having a drive gear rotatable about a drive-gear axis mounted on an angle transmission having a housing formed unitarily of one piece with a throughgoing passage centered on a longitudinal axis, a plurality of substantially planar outer faces each extending substantially parallel to the axis, one of the outer faces bearing flatly on the drive unit, a transverse bore opening at and extending between the one face and the passage along an axis transverse to the longitudinal axis, and a plurality of undercut grooves extending longitudinally the full length of the housing and opening at least at the one outer surface. Each of the grooves is substantially narrower at the respective outer face than inward therefrom measured in a direction transverse to itself and parallel to the respective outer face. A main gear is rotatable in the passage about the longitudinal axis and a drive gear is rotatable about the transverse axis in the transverse bore in mesh with the main gear. A plurality of bolts seated in the drive unit each have an enlarged end in a respective one of the grooves of the one face so that the bolts clamp the drive unit and housing together parallel to the transverse axis.

13 Claims, 7 Drawing Sheets

TRANSMISSION HOUSING

CROSS REFERENCE TO RELATED APPLICATIONS

This application is the U.S. national phase of PCT application PCT/AT93/00076 filed 3 May 1993 with a claim to the priority of Austrian application A 903/92 filed 4 May 1992.

FIELD OF THE INVENTION

The invention relates to a transmission housing, in particular for an angle, e.g. worm-type, transmission that has a throughgoing in particular cylindrical passage which runs longitudinally of an extruded profile forming the housing, that has outwardly open grooves that open at planar outer faces of the housing that in turn are inclined to each other preferably at 90°, and that has starting from one of the planar outer faces a bore which is formed in the housing and whose surface joins the surface of the passage extending longitudinally through the extruded profile.

BACKGROUND OF THE INVENTION

A housing of this type is known from German published patent application 2,944,398 where the outer face of the housing body has three longitudinally extending recesses for receiving threaded bolts that extend all the way through and secure two housing covers with each other. The walls of the recesses diverge outwardly so that the connecting bolts can be inserted transversely to their longitudinal axes into the recesses. Problems are encountered with such a housing when the housing is to be secured to a machine or when it is to be mounted on a flange motor.

OBJECT OF THE INVENTION

It is therefore an object of the present invention to provide and improved transmission housing.

SUMMARY OF THE INVENTION

The invention proposes a solution in that the grooves are undercut, in particular to be T-shaped, trapezoidal, or dovetail-shaped, and the mouths of the grooves at the outer faces are the groove regions of minimal width. This constructions makes it possible to secure the housing on a machine by screws whose heads are inserted in the undercut grooves so that the housing can sit with the respective planar outer face flat against the support surface of the machine. Similarly a motor can be flange mounted, with its flange sitting flush on the outer face.

In a further embodiment of the housing according to the invention an angle, preferably a worm-drive, transmission, can be provided with the above-described housing.

It is known from above-named German published application 2,944,398 to form the bore for receiving the worm as a throughgoing bore. The throughgoing bore is thus closed at both of its ends by covers which position in the bore the roller bearings provided for rotatably supporting the worm shaft. The outer races of the roller bearings thus contact the bore wall and are supported from the side by the respective cover. The inner race of each roller bearing bears against an end face of the worm body. In this arrangement there are two locations in the bore to be sealed. In addition the bore needs to be machined in order to mount the roller bearings properly by means of their outer races.

It is another object of the invention to simplify this system. This is achieved in an angle, in particular in a worm-drive, transmission of the above-described type where the shaft carrying the drive gear (worm) has a bearing, in particular a roller bearing provided in a housing that is flanged to the extruded profile with the flange lying on one of that one of its outer faces from which the bore extends and where the housing holding the bearing is the housing of a flange motor whose rotor shaft carries on its free end the drive gear (the worm) or that the drive-gear shaft traverses the bearing housing and the second bearing, in particular a needle bearing, is arranged in the housing formed by the extruded profile in a housing bore formed as a blind bore. This arrangement has the advantage that at least one bearing of the drive gear or the worm is situated in a separate housing and can therefore be machined independently of the transmission housing so that the transmission housing needs no further machining at least with respect to mounting the worm except for the formation of the bore which is formed as a blind bore. When the housing for the bearing is also the housing of a flange motor, the second bearing location is thus in this housing and is formed by the bearing for the rotor shaft. If however the shaft of the drive gear passes through the bearing housing and the shaft end that is outside the bearing housing serves a drive purpose, the second bearing location of the drive-gear shaft is aligned with and forms a continuation of the blind bore. The bearing can be a needle bearing.

As far as the bearings for the main gear are concerned, according to a particular feature of the invention a bearing, in particular a roller, e.g. ball, bearing is provided to each side of the main gear, each bearing being mounted in a sleeve set in the throughgoing passage of the extruded profile or this sleeve serves as the bearing. Thus in order to support the main gear on bearings no special machining is necessary. The bearings are held by special sleeves which are inserted in the throughgoing passage of the extruded profile. This has the advantage that the outer diameter of the sleeves can be fitted to the actual diameter of the throughgoing passage of the extruded profile, without regard to wear of the extruding die or thermally created changes of the extruding die.

It is of particular advantage when the roller bearings are also used to retain the sleeves in the housing. To this end the outer race of the bearing bears on a shoulder of the sleeve and the inner race of the roller bearing bears on a spring ring fitted in an annular groove of the main-gear shaft. The sleeve can have an outer flange that contacts that face of the extruded profile from which the throughgoing passage extends. These are the end faces of the housing formed by the extruded profile.

To retain the sleeves according to a particular embodiment of the object of the invention a plurality, in particular three, tie bolts are provided, each traversing two axially aligned bores in the sleeves, to clamp the sleeves against each other.

To seal the bore holding the tie bolts it is advantageous to provide washers of elastically deformable material, in particular plastic, which are arranged between either the bolt head or the bolt nut and the adjacent outer face of the sleeve. When the sleeves are tightened together by tightening the bolt nuts material of the washers enters into the screwthreads so that the screwthreads are sealed.

BRIEF DESCRIPTION OF THE DRAWINGS

The invention will be described more closely below with reference to embodiments shown in the drawing. There is shown in:

FIG. 1, is not driven by a flange-mounted motor but which is driven via other means such as gears or belt pulleys;

SPECIFIC DESCRIPTION

Figure 1:
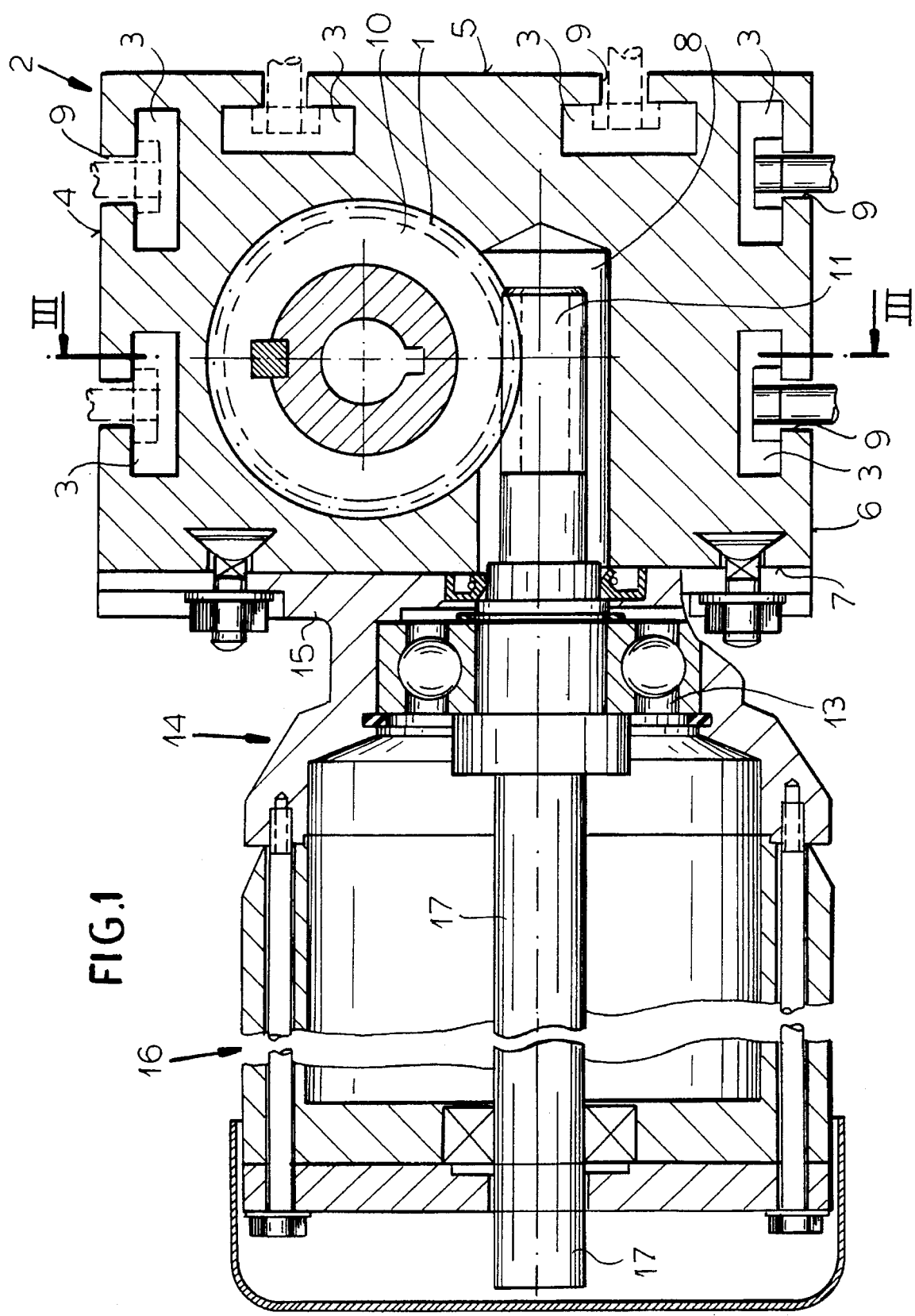
FIG. 1 a cross-section through an embodiment of a transmission housing.
Figure 2:
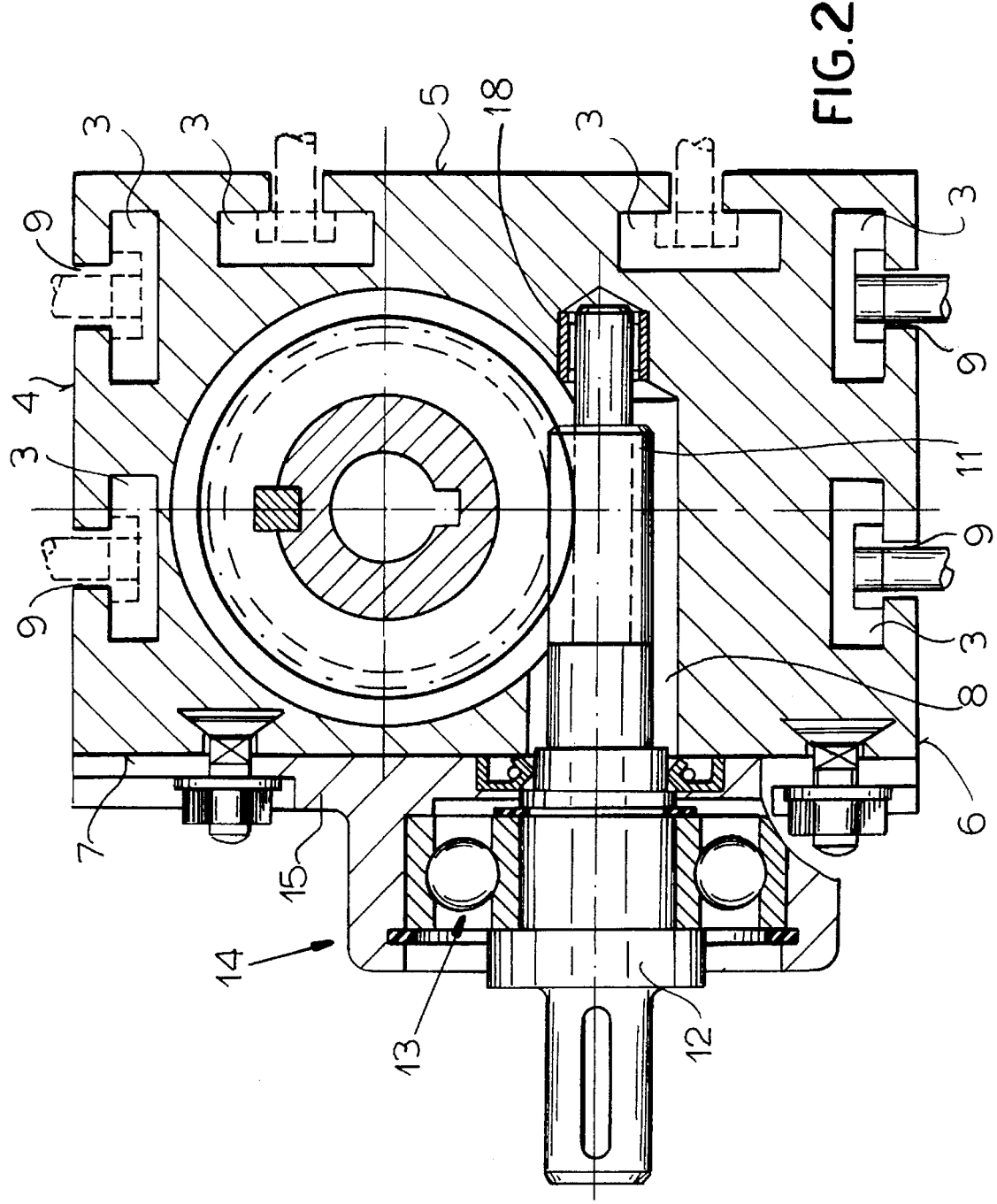
FIG. 2 a transmission housing as in FIG. 1 but for a transmission which, unlike

The transmission housing is generally indicated in the drawing at 2. According to FIGS. 1 to 5 it serves for holding a worm drive. It can also generally serve for another angle drive, e.g. a bevel-gear transmission (FIGS. 6 and 7) or a face-gear transmission. The housing is formed as an extruded profile and has a laterally closed, in particular cylindrical passage 1 extending longitudinally through the profile. The housing 2 is formed externally with grooves 3 that open at planar outer faces 4, 5, 6, and 7 of the housing. Each of the outer faces forms a corner with an adjacent outer face at an angle here of 90°. The housing 2 thus forms a prism with a four-sided, in particular rectilinear, footprint. A bore 8 enters the housing from the planar outer surface 7 of the housing. In special cases this bore 8 is blind. The inner wall surface of the bore 8 joins the surface of the passage 1 longitudinally traversing the extruded profile. The grooves 3 are undercut and have in the illustrated embodiment T-shapes as shown on surfaces 4, 5, and 6 or trapezoidal shapes as shown on surface 7, and can also be of L-shaped so that each of the openings 9 at the outer faces 4, 5, 6, and 7 of each groove 3 is the narrowest part of the groove cross section. The grooves 3 can receive the heads of bolts with which the housing 2 is secured to a machine or the like.

The main gear 10 of the transmission is arranged in the passage 1 and the small gear 11 (worm or bevel gear) is arranged in the bore 8 opening at the outer face 7 of the extruded profile. A bearing in the form of a single roller bearing 13 in a housing 14 or as in FIG. 6 two bearings 13 are provided for the shaft 12 carrying the gear 11 (worm or bevel gear). A housing 14 is flanged to the extruded profile. The flange 15 of the housing 14 contacts that outer face 7 of the extruded profile at which the bore 8 opens.

In the embodiment of FIG. 1 the housing 14 of the bearing is the housing of a flange motor 16. The output shaft 17 of the flange motor 16 has on its free end the gear 11 (worm). In the embodiment according to FIGS. 2 and 6 the gear shaft traverses the bearing housing 14 so that drive torque is applied to the shaft stump projecting from the bearing housing 14. The second support bearing of the gear shaft 12 is in the case of a worm drive (FIG. 2) in the housing 2 and is preferably formed as a needle bearing 18. The needle bearing is fitted in a blind bore aligned with the bore 8 of the housing. According to the embodiment of FIG. 6 the gear 11, which is a bevel gear, is mounted on the shaft 12 in an overhung manner.

A roller bearing 19 can be provided to each side of the main gear 10 of the transmission to support it. The main gear 10 can also as not shown be supported on each side in a journal.

Figure 3:
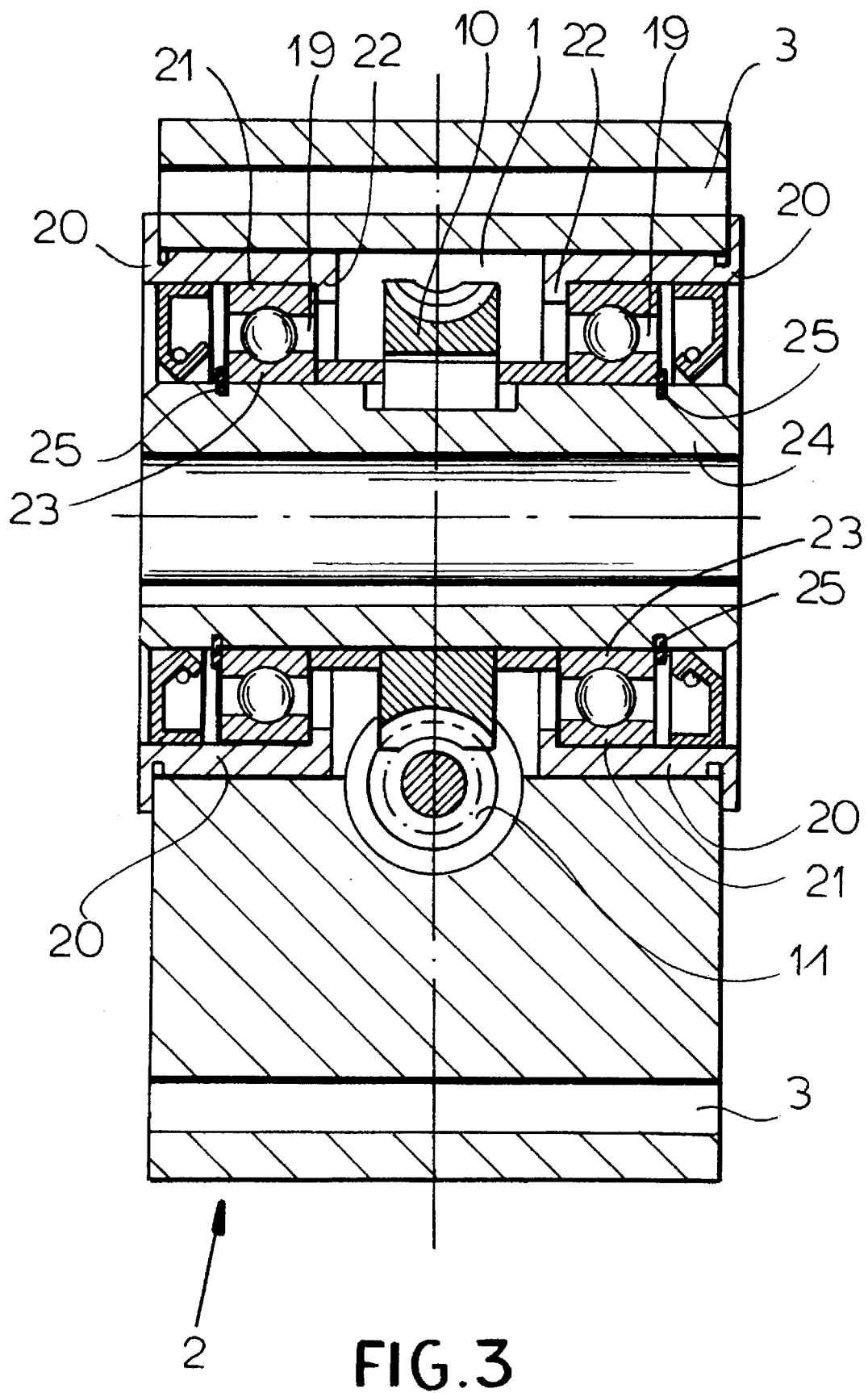
FIG. 3 is a section taken along line III—III of FIG. 1.
Figure 4:
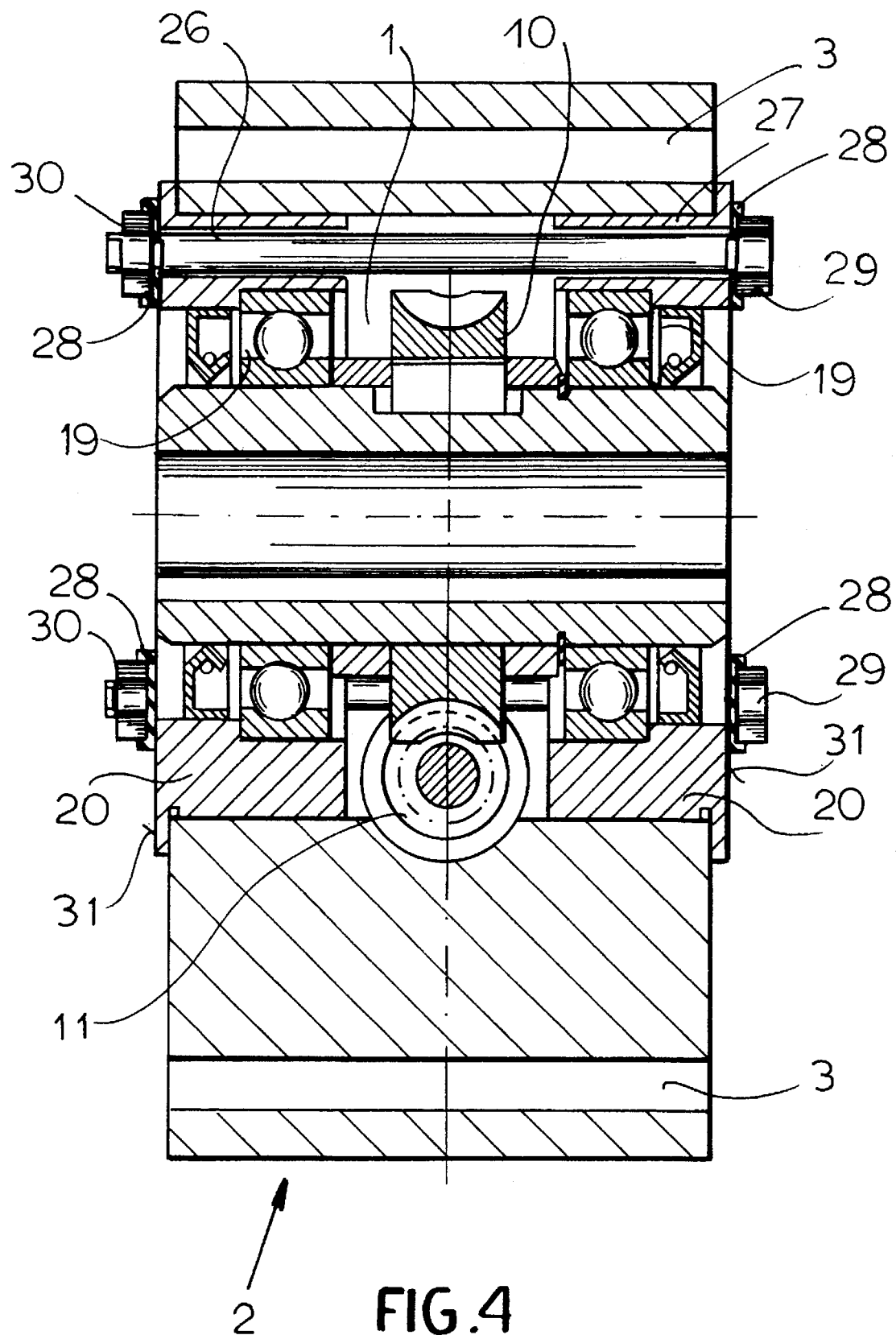
FIG. 4 is a modified version of the FIG. 3 embodiment in a view like FIG. 3.

In the embodiment according to FIGS. 3 and 4 each of the roller bearings 19 for supporting the main gear 10 is arranged in a sleeve 20 fitted in the passage 1 of the extruded profile.

Figure 5:
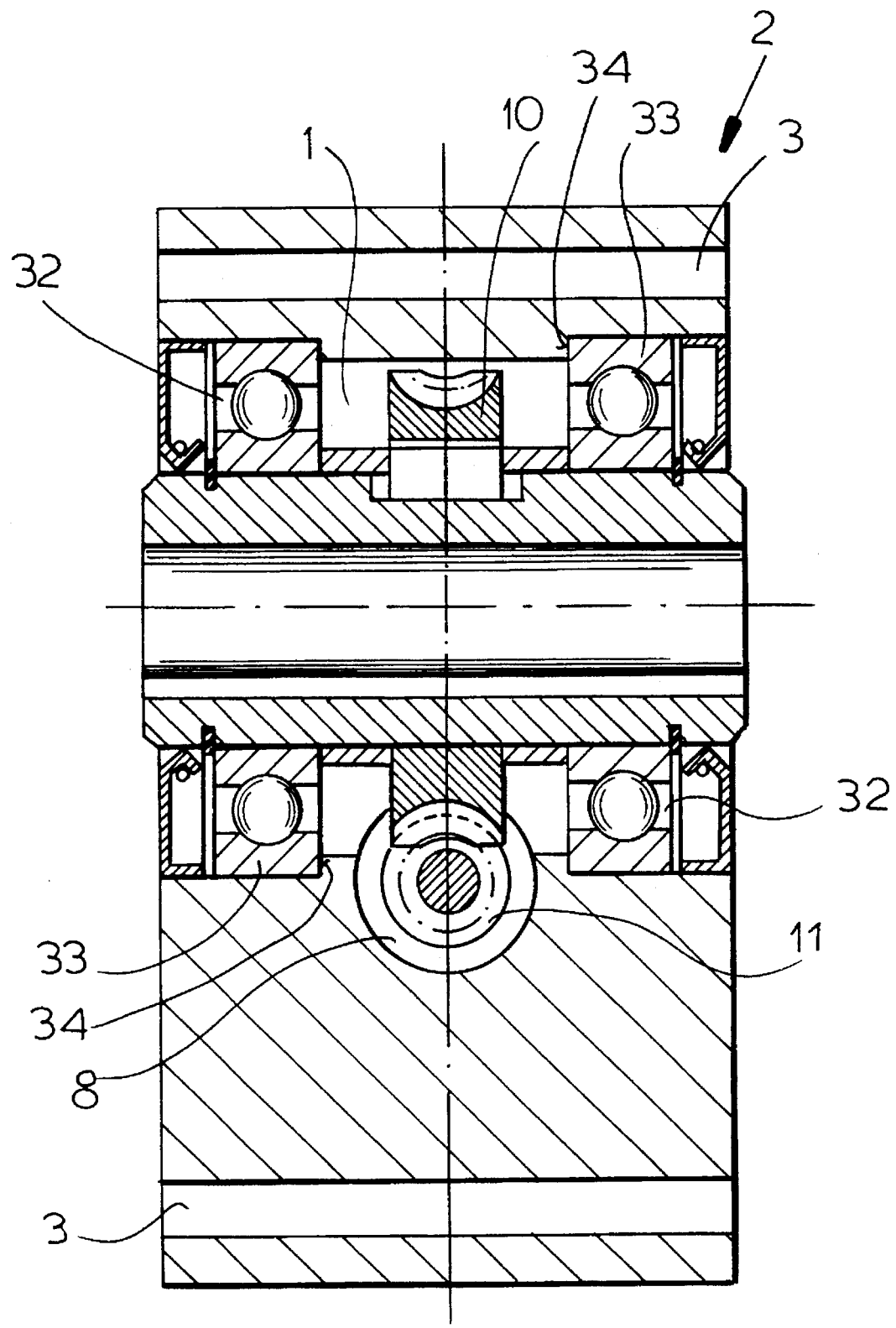
FIG. 5 is also a modified embodiment in a view like FIG. 3.
Figure 6:
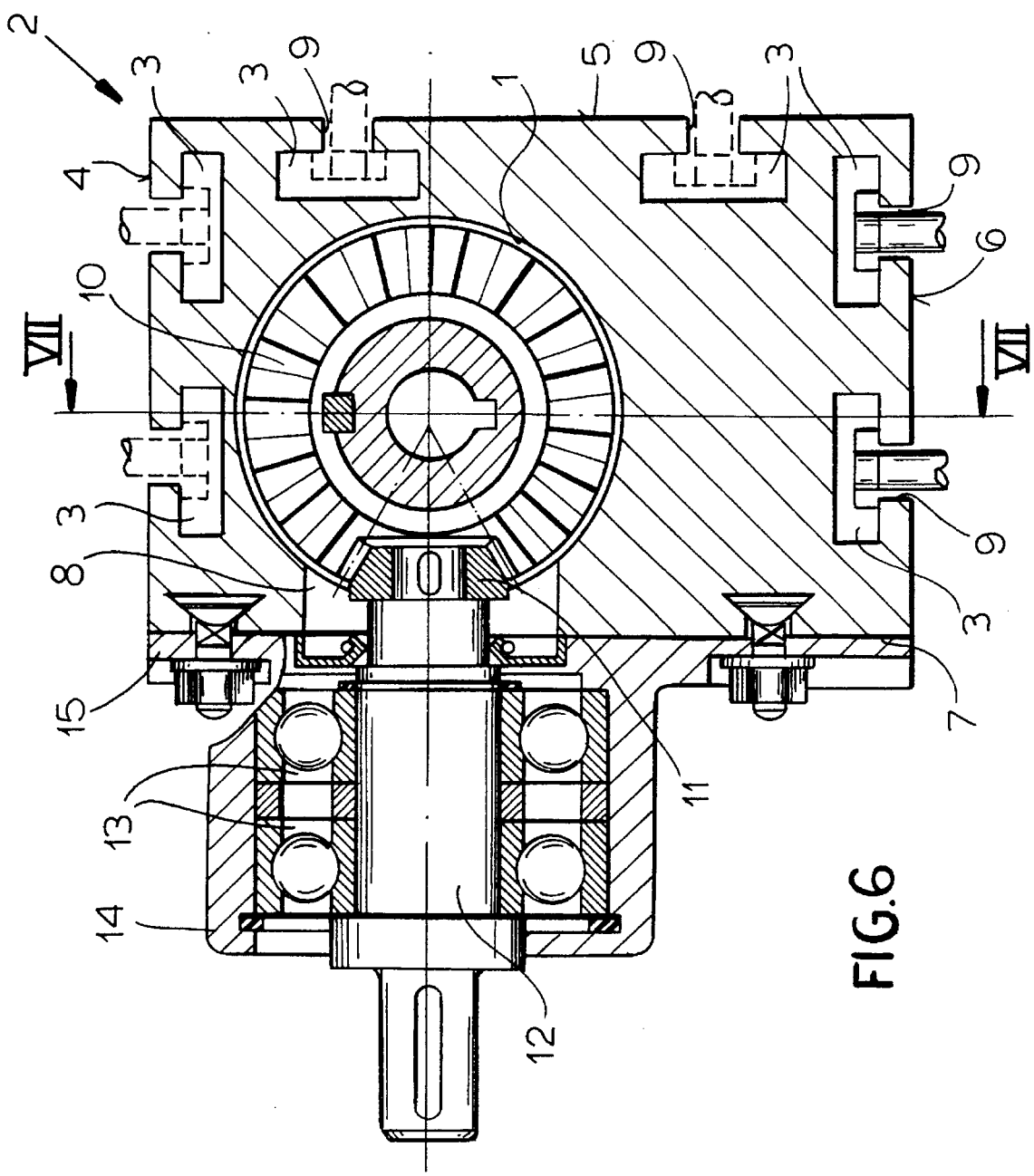
FIG. 6 is an angle drive with bevel gearing in a view like FIG. 3.
Figure 7:
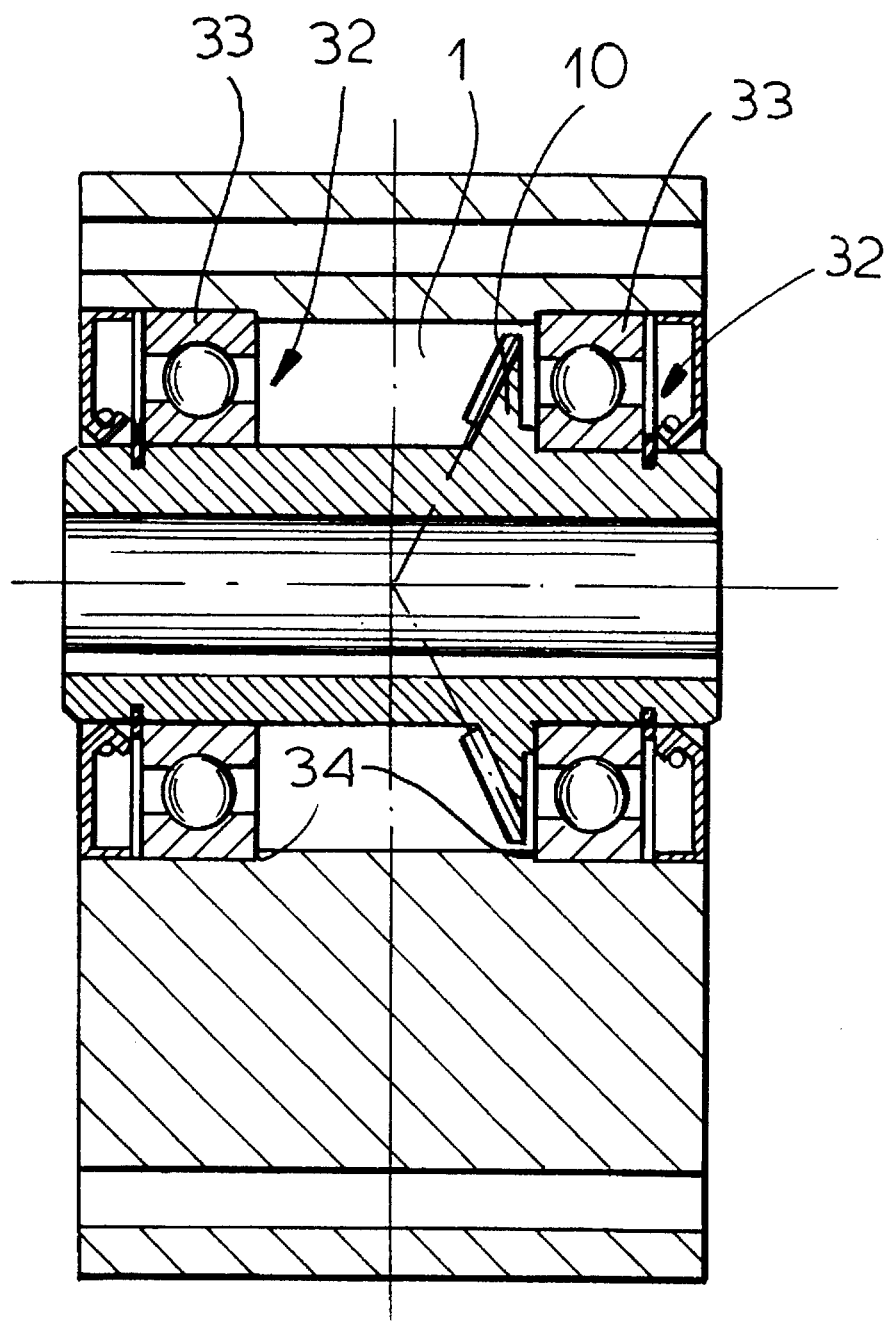
FIG. 7 is a section taken along line VII—VII of FIG. 6.

In the embodiment according to FIGS. 5 and 6 there are also roller bearings 32 to both sides of the main wheel 1, with their outer races 33 each set in a cutout of the passage 1 of the housing 2 and bearing against a shoulder 34 at an inner end of the cutout.

In the embodiment according to FIG. 3 each of the sleeves 20 is held via the respective roller bearing 19 in the passage 1 so that the outer race 21 of the roller bearing contacts a shoulder 22 of the sleeve 20 and the inner race 23 of the roller bearing contacts a spring ring 25 set in a groove of the main-gear shaft 24.

In a modified embodiment shown in FIG. 4 several, here three, tie bolts 26 are provided to retain the sleeves 20. Each tie bolt traverses two aligned axial bores in the sleeves 20. The tie bolts clamp the two sleeves 20 toward each other.

Washers 28 of elastically deformable material, in particular plastic, are provided to outwardly seal the axial bores 27. These washers 28 are each mounted between the respective bolt head 29 or nut 30 and the adjacent outer face 31 of the sleeve 20. When the nuts 30 are tightened the washers 28 are compressed so that material of the washers is forced into the threads of the tie bolts 26 or of the nuts 30 to seal this screwthread.

The blank for the transmission housing can be made simply by cutting the housing from the extruded profile at the necessary length. Aside from forming a bore for receiving the worm and if necessary its bearings or in a bevel-gear transmission the bore for the bevel gear, the housing needs no further machining.

I claim:

1. In combination with a drive unit having a drive gear rotatable about a drive-gear axis, an angle transmission comprising:

a housing formed unitarily of one piece with a through-going passage centered on a longitudinal axis, a plurality of substantially planar outer faces each extending substantially parallel to the axis, one of the outer faces bearing flatly on the drive unit, a transverse bore opening at and extending between the one face and the passage along an axis transverse to the longitudinal axis, and a plurality of undercut grooves extending longitudinally the full length of the housing and opening at least at the one outer surface, each of the grooves being substantially narrower at the respective outer face than inward therefrom measured in a direction transverse to itself and parallel to the respective outer face;

a main gear rotatable in the passage about the longitudinal axis;

a drive gear in the transverse bore in mesh with the main gear and rotatable about the transverse axis; and a plurality of bolts seated in the drive unit and each having an enlarged end in a respective one of the grooves of the one face, the bolts clamping the drive unit and housing together parallel to the transverse axis.

2. The transmission defined in claim 1 wherein the slots are T-slots.

3. The transmission defined in claim 1 wherein the slots are of trapezoidal shape.

4. The transmission defined in claim 1 wherein the outer faces meet at corners and form angles of substantially 90° at the corners.

5. The transmission defined in claim 1 wherein the drive unit includes a motor.

6. The transmission defined in claim 1, further comprising
a bearing in the bore of the housing supporting the drive gear for rotation about the transverse axis.

7. The transmission defined in claim 1 wherein the transverse bore extends generally tangentially of the passage and is a blind bore.

8. The transmission defined in claim 1, further comprising:
a main shaft extending along the longitudinal axis and carrying the main gear; and
a pair of bearings in the passage flanking the main gear and having outer races bearing on the housing and inner races mounted on the main shaft.

9. The transmission defined in claim 8 wherein the passage is generally cylindrical and has axially oppositely directed shoulders against which the outer races bear axially.

10. The transmission defined in claim 8, further comprising
a pair of sleeves flanking the main gear, set in the passage, and each forming a seat for a respective one of the outer races of the bearings.

11. The transmission defined in claim 10 wherein each of the sleeves is formed with a shoulder bearing axially on the respective outer race.

12. The transmission defined in claim 11 wherein the shoulders are directed axially outward, the transmission further comprising
tie bolts extending parallel to the longitudinal axis in the passage and each having one end bearing axially inward on one of the sleeves and an opposite end bearing axially oppositely inward on the other sleeve.

13. The transmission defined in claim 11 wherein the shoulders are directed axially inward, the transmission further comprising:
tie bolts extending parallel to the longitudinal axis in the passage and each having one end bearing axially inward on one of the sleeves and an opposite end bearing axially oppositely inward on the other sleeve; and
abutment rings set in the main shaft axially immediately outward of and bearing axially outward on the respective inner races.

\* \* \* \* \*